Figure 1:
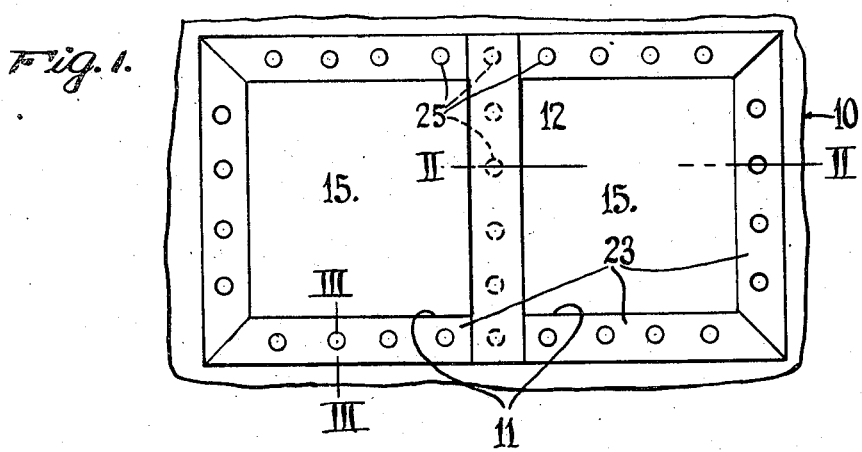

July 2, 1946.  D. T. DOWNES  2,403,060

INSTALLATION FOR LAMINATED GLASS

Filed April 23, 1943  2 Sheets-Sheet 1

INVENTOR
DANIEL T DOWNES

BY  Olen E. Bee
ATTORNEY.

July 2, 1946.  D. T. DOWNES  2,403,060
INSTALLATION FOR LAMINATED GLASS
Filed April 23, 1943  2 Sheets-Sheet 2
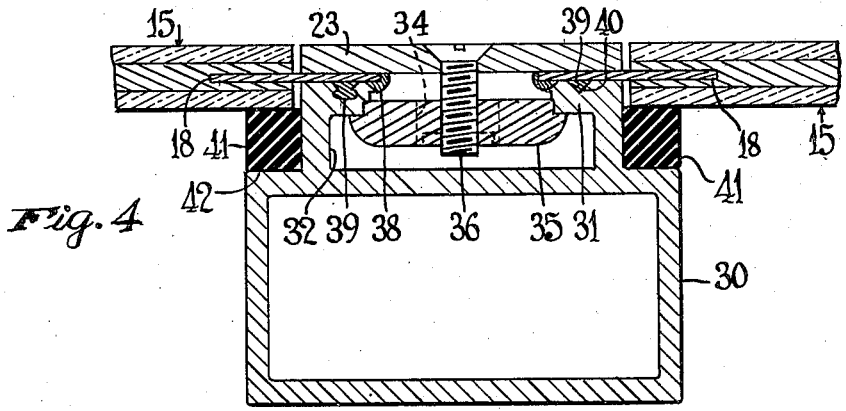
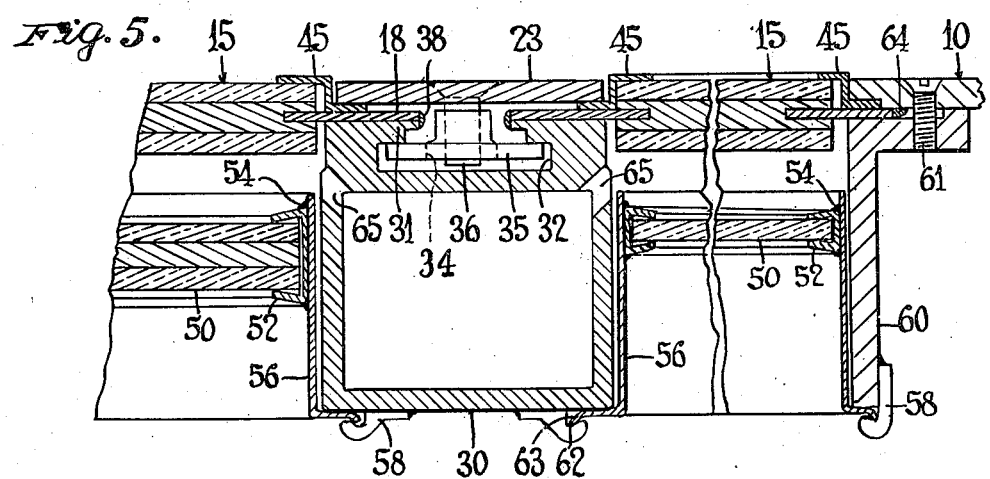
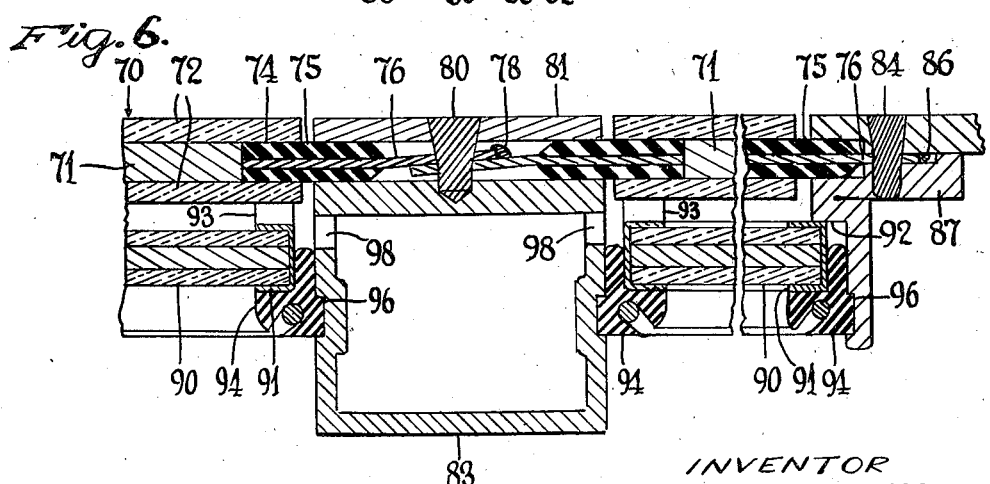
INVENTOR
DANIEL T. DOWNES
BY Olen E. Bee
ATTORNEY.

Patented July 2, 1946

2,403,060

UNITED STATES PATENT OFFICE 2,403,060

INSTALLATION FOR LAMINATED GLASS

Daniel T. Downes, Creighton, Pa., assignor to Pittsburgh Plate Glass Company, Allegheny County, Pa., a corporation of Pennsylvania Application April 23, 1943, Serial No. 484,189

4 Claims. (Cl. 189—64)

This invention relates to transparent closure structures, and it has particular relation to surrounding supports for such structures in which laminated glass units are flexibly mounted in wall sections without clamping the glass portions of the units.

One object of the invention is to provide an improved closure structure in which laminated glass is connected to surrounding frame elements by flexible deformable elements adapted to be soldered or welded to supporting members.

Another object of the invention is to provide an improved mounting structure for closure panels embodying a laminated glass unit in which flexible edge extensions are included with mounting elements adapted to sustain the laminated unit in an opening in a wall section.

Another object of the invention is to provide an improved means for mounting and bracing a laminated unit in a surrounding frame structure that supports such unit.

Figure 2:
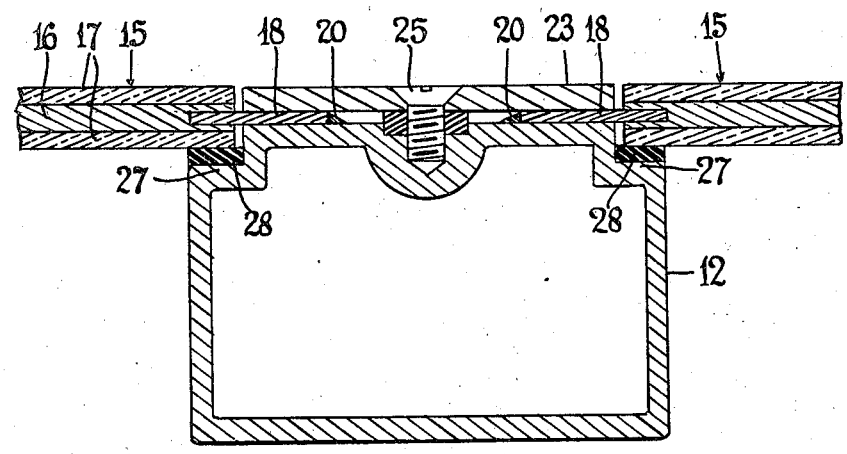
Figure 3:
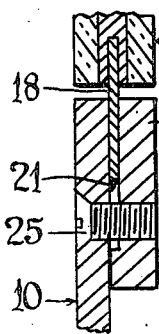

In the drawing:

Fig. 1 is a fragmentary side elevation of a wall section including a laminated closure structure as viewed from the inside of a compartment, or other enclosure, in which the structure is adapted to be installed; Fig. 2 is a fragmentary horizontal section, on a larger scale, taken substantially along the line II—II of Fig. 1; Fig. 3 is a fragmentary vertical section, on a larger scale, taken substantially along the line III—III of Fig. 1; Fig. 4 is a fragmentary horizontal section similar to Fig. 2, but in which another form of clamping structure is included; and Figs. 5 and 6 are fragmentary horizontal sections similar to Fig. 4 of other forms of structure adapted to be included in a wall section of the type shown in Fig. 1.

In practicing the invention, a wall section 10 which can be a part of an airplane compartment, vehicle, or other structure, is provided with openings 11 separated by a frame member or pier 12 that is rigidly mounted in, and forms a part of the wall section. A laminated unit 15 is disposed in each opening and comprises a sheet interlayer 16 of organic plastic, such as vinyl acetal resin, or other resin that is adapted to be employed as interlayer material in laminated glass. Plates of glass 17 are bonded upon opposite sides of the sheet of interlayer. The edges of the sheet interlayer and glass plates are substantially coincidental. Flexible and resilient sheet metal 18 in strip form is disposed between the marginal portions of the glass plates and is bonded to the sheet interlayer in such manner that the metal does not touch the glass. The strip metal extends entirely and continuously around the perimeter of each laminated unit and constitutes a flexible and resilient mounting flange that can be suitably connected to a supporting structure.

The laminated units 15 with the flexible strip metal 18 extending therefrom are disposed in the wall section in such manner that the strip metal overlaps the adjacent surfaces of the pier 12 and marginal portions of the wall section that defines the openings. In this position the outer edges of the strip metal are welded or soldered to the pier 12, as indicated at 20, and to the marginal portions of the wall section, as indicated at 21 (Fig. 3). The welding or soldering is continuous entirely around the laminated units for the purpose of securing a strong fluid-tight joint structure. Clamping plates 23 overlie the strip metal 18 along the frame member 12 and edges of the wall section, and are firmly clamped in place by means of bolts 25 passing through these elements. It will be observed that coplanar portions of the strip metal 18 of both laminated units 15 (Fig. 2) are confined by the central clamping plate 23 along the clamping side of the central frame member 12.

The member 12 is formed with opposite shoulders 27 overlapping the glass portions of the laminated units, and strips 28 of rubber, plastic, wood, or other suitable material, are secured upon these shoulders to serve as abutments or buffers against which the laminated units can be pressed within the range of play permitted by the flexibility of the strip metal 18. Particularly in windshields of high speed aircraft, provision must be made to withstand pressures of considerable magnitude. The shoulders 27 and strips 28 constitute effective means for properly withstanding and distributing at least parts of such pressures without exertion of any clamping forces on the glass plates.

In the form of structure shown in Fig. 4 the laminated units 15 with their strip metal borders 18 are the same as those shown in Figs. 1 and 2. However, different pier or central frame structure 30 is provided in that the latter is formed with inwardly turned flanges 31 which define a channel 32 in which oblong bars 35 are disposed and adapted to be turned crosswise of the channel so as to serve as nuts engageable upon the undersides of the flanges 31. The width of the bars 35 is indicated by broken lines 34 and these bars are placed longitudinally between the flanges 31 in the position indicated by such broken lines before they are turned approximately 90 degrees about the axis of the fastener 36 to the full line position wherein they are clamped. Fastening elements 36, such as screws or bolts, pass through the clamping plate 23, and by tightening the bolts 36 the strip metal 18 of the laminated units can be clamped against the flanges 31. Before the plate 23 is applied the strip metal 18 is soldered or welded to the inwardly turned flanges, as indicated at 38. If desired cushioning sealing strips 39 can be mounted in grooves 40 formed in the outer sides of the flanges in such position as to bear against the sides of the strip metal. The area of welding 38 extends entirely around the perimeter of the laminated unit in order to insure permanent metal-to-metal and fluid-tight connection of the welded elements to support the glass units.

The portions of the laminated unit other than those just described for the pier connection are secured in the same manner as that shown in Fig. 3. If desired, a strip 41 of packing, rubber, or other material similar to the material 28, can be mounted between the inside glass edges of each unit and a shoulder 42.

In Fig. 5 the laminated panels 15 are the same in construction as those shown in Fig. 4, with the exception additional strip metal sections 45 of substantially Z-shape in cross section are confined at their inner edge portions, together with the strip metal 18, between the cover plates 23 and the supporting structure. The outer edge portion of the strip metal of Z-shape overlaps the outside marginal portion of the outer glass plate of the laminated unit 15.

An arrangement of this kind can be combined with additional panel units 50 which are mounted in channels 52, welded, as indicated at 54, upon outer sides of metal angle strips 56. Brackets 58 are welded to the pier 30 and to angle iron strips 60 which confine portions of the strip metal 18 and Z-strip 45 to the wall section 10 by means of fasteners 61 corresponding substantially to the fasteners 36. The outer edges of the strip metal 18 are welded, as indicated at 64, to the wall section 10 to correspond to the welding shown at 21. The brackets 58 are provided with sockets 62 into which curved flanges 63 are adapted to be sprung and locked. The inner panels 50 of the double glazed structure can thus be demounted to facilitate periodic cleaning of the glass. Openings 65 in the central pier 30 which is hollow provides communication to the space between the panels of the double glazed structure and through which air at desired high or low temperatures can be circulated from a suitable source (not shown).

With reference to Fig. 6, laminated units 70 are constructed similarly to the units 15 although a different form of marginal structure is included. Each unit 70 comprises sheet interlayer material 71 of organic plastic, such as vinyl acetal, or other resin that is adapted to be employed in laminating glass. Plates of glass 72 are bonded upon opposite sides of the interlayer material. The edges of the glass plates extend beyond the edges of the interlayer material and define therewith a marginal channel 74 in which rubber compound 75 in strip form is mounted in such manner as to extend substantially as a continuation of the interlayer material 71 to form a flexible mounting flange entirely around the laminated unit. The rubber is applied upon opposite sides of strip metal 76 which extends outwardly beyond the strip rubber. The plastic substance constituting both the resinous compound and the rubber composition thus forms a compound interlayer. By utilizing a process known as "cycle welding," the surfaces of the rubber are bonded to the opposing faces of the glass plates inside the channel 74. The strip rubber is also bonded in like manner to opposite sides of the strip metal and its inner edges are abutted and bonded against the outer edges of the interlayer 71 at the bottom of the channel 74. The strip metal is thus wider than the strip rubber and extends outwardly beyond the latter sufficiently to insure ample free metal space for welding. It is to be understood that the bonding of the rubber to the glass and to the strip metal insure substantially integral unions much stronger than those obtainable by bonding glass to resin ordinarily used in laminating glass.

The extended portions of the strip metal 76 in adjacent windows are overlapped and welded together, as indicated at 78, to form a fluid-tight, integral metal connection between the two laminated units 70. Rivets 80 pass through an outer cover plate or strip 81 and through the overlapped portions of the strip metal 76 into a hollow supporting pier 83. The marginal strip metal portions 76 other than those connected, as described, to the pier 83, are connected to the wall section by means of rivets 84 and, in addition, by means of welding of the strip metal directly to the wall section, as indicated at 86. At this location the rivets also pass through angle plates 87 which cover the welded margins. The rivets 80 and 84 can be further secured by spot welding which provides a strong integral connection among all of the elements through which such rivets pass.

In connection with this construction, additional panel units 90, which are embraced at their edges by metal channels 91, can be installed to form double glazing. The angle plate 87 is provided with a shoulder 92 against which the units 90 are fitted to space them from the units 70, and additional spacers 93 between the units 70 and 90 can be inserted. Rubber molding strips 94 fastened in grooves 96 and wedged behind the panel units 90 are demountable for the purpose of facilitating the removal of the panel units 90 at any time as desired. Openings 98 in the central pier 83 provide communication with the space between the units of the double glazed structure and through which air at desired high or low temperatures can be circulated from a suitable source (not shown).

Although more than one form of structure has been shown and described, it will be apparent to those skilled in the art that the invention is not so limited, but that various changes can be made therein without departing from the spirit of the invention or from the scope of the appended claims.

I claim:

1. In a closure installation, a pair of laminated window sections forming portions of a continuous wall section, strip metal mounted in each of said window sections and extending therefrom to form a mounting border, the strip metal from one window section overlapping the strip metal of the other section and including an integral metal-to-metal welded connection therebetween, and means engaging the overlapping strip metal to serve as a support for the window sections.

2. In a closure installation an interlayer sheet of organic plastic, glass plates bonded upon opposite sides of said sheet, the edges of the glass plates extending beyond the edges of said sheet and defining a channel between the marginal portions of the glass plates, flexible strip metal disposed between the marginal portions of said plates and extending outwardly therefrom to form a metal mounting flange, rubber compound bonded to opposite sides of the strip metal and to opposed marginal portions of the glass plates inside the channel, metal supporting structure surrounding the glass plates, and a welded metal-to-metal joint between the strip metal and the supporting structure disposed outwardly from the edges of the glass plates.

3. In a closure installation, an interlayer sheet of organic plastic, glass plates bonded to opposite sides of and extending beyond the edges of said sheet to define a channel between the marginal portions of said plates, flexible sheet metal in strip form having one edge disposed between the marginal portions of the glass plates in the channel and having its other edge extending outwardly beyond the edges of said plates, and rubber compound in strip form bonded to opposite sides of said strip metal and to opposed faces of the glass plates inside the channel, said rubber extending outwardly beyond the edges of the glass plates and the strip metal extending outwardly beyond the edges of the rubber.

4. In a closure installation, an interlayer sheet of organic plastic, glass plates bonded to opposite sides of and extending outwardly beyond the edges of said sheet to define a channel between the marginal portions of said plates, flexible sheet metal in strip form having one edge disposed between the marginal portions of the glass plates in the channel and having its other edge extending outwardly beyond the edges of said plates, rubber compound in strip form bonded to opposite sides of said strip metal and to opposed faces of the glass plates inside the channel, said rubber extending outwardly beyond the edges of the glass plates and the strip metal extending outwardly beyond the edges of the rubber, metal supporting structure clamped on opposite sides of the strip rubber at a location outwardly spaced from the edges of the glass plates, and a metal-to-metal welded joint between the strip metal and the metal supporting structure.

DANIEL T. DOWNES.